United States Patent [19]

Dean

[11] 4,054,106
[45] Oct. 18, 1977

[54] MONOLITHIC FEED AND WATERING DEVICE FOR NEWBORN POULTRY

[76] Inventor: Charles B. Dean, Star Rte. Box 75, Dunlap, Tenn. 37327

[21] Appl. No.: 652,753

[22] Filed: Jan. 27, 1976

[51] Int. Cl.² ............... A01K 7/02; A01K 39/04
[52] U.S. Cl. ........................... 119/51.5; 119/78
[58] Field of Search ............ 119/51.5, 72, 78, 79, 119/80, 61

[56] References Cited

U.S. PATENT DOCUMENTS 946,802  1/1910  McKinney ................. 119/80
2,527,324 10/1950 Muehfeld ................ 119/51.5

Primary Examiner—Hugh R. Chamblee

[57] ABSTRACT

The present invention is a feed and watering device for newborn poultry having a plurality of shallow feed pans integrally formed on a circular shaped base equidistant from the center of the base and adjacent each other. A plurality of interconnected watering troughs are also formed integrally with the base between adjacent feed pans. A tank, also integrally formed with the base, is provided with a float actuated valve for maintaining the water level in each of the troughs constant.

5 Claims, 7 Drawing Figures

MONOLITHIC FEED AND WATERING DEVICE FOR NEWBORN POULTRY

BACKGROUND OF THE INVENTION

1. Field of the Invention the present invention relates to new and useful improvements in feed and watering devices for poultry of all kinds and more particularly for newborn poultry being raised between one and fourteen days beneath a brooder.

2. Description of the Prior Art and Objects

Applicant is unaware of any poultry feeding and watering device having feed pans, water troughs and interconnecting piping integrally constructed with a base to form a monolithic unit. The U.S. Patents to Redfield, U.S. Pat. No. 1,795,377 and Muehlfeld, U.S. Pat. No. 2,527,324 disclose poultry feeders which exemplify the prior art in this area.

It is therefore the foremost object of the present invention to provide a combined feed and watering device which, due to its unique construction and method of operation, greatly reduces the mortality rate of newborn poultry.

It is another object of the invention to provide a device having a plurality of individual, interconnected watering troughs wherein the water is continuously being replenished from a fresh, external source thus eliminating the use of unhealthy stale water heretofore stored in jugs.

It is still another object of the invention to provide a device which is of single, lightweight construction for easy set-up, take-down and storage.

It is yet another object of the invention to provide a device which segregates the water and feed and provides a plurality of watering troughs, the water level in each of which can be controlled, thus eliminating the possibility of spillage into the feed or into the surrounding litter thereby promoting a healthful, germ-breeding free living condition for the newborn poultry.

It is a further object of the invention to provide a device which has only one moving part, thus reducing maintenance costs.

It is a still further object of the invention to provide a device which is circular in shape and of a low profile which enables it to fit easily beneath and within the vital heat zone of a brooder.

It is yet a further object to provide a device which is of one piece, molded construction and which can be economically manufactured and easily cleaned.

Other advantages and objects will become apparent during the course of the following description.

IN THE DRAWINGS

DESCRIPTION OF THE PREFERRED EMBODIMENT

Figure 1:
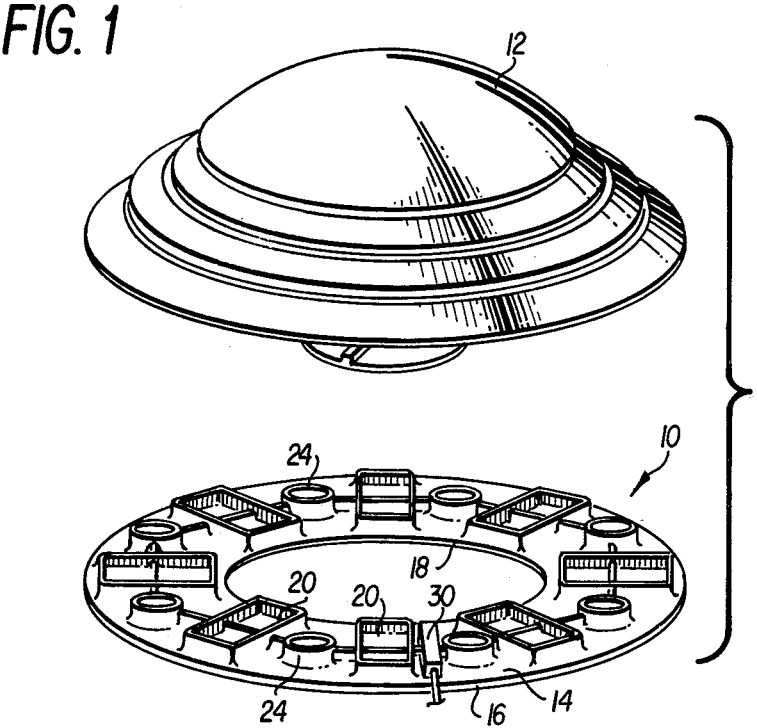
FIG. 1 is a perspective view of the feed and watering device of the present invention beneath a brooder hood.
Figure 2:
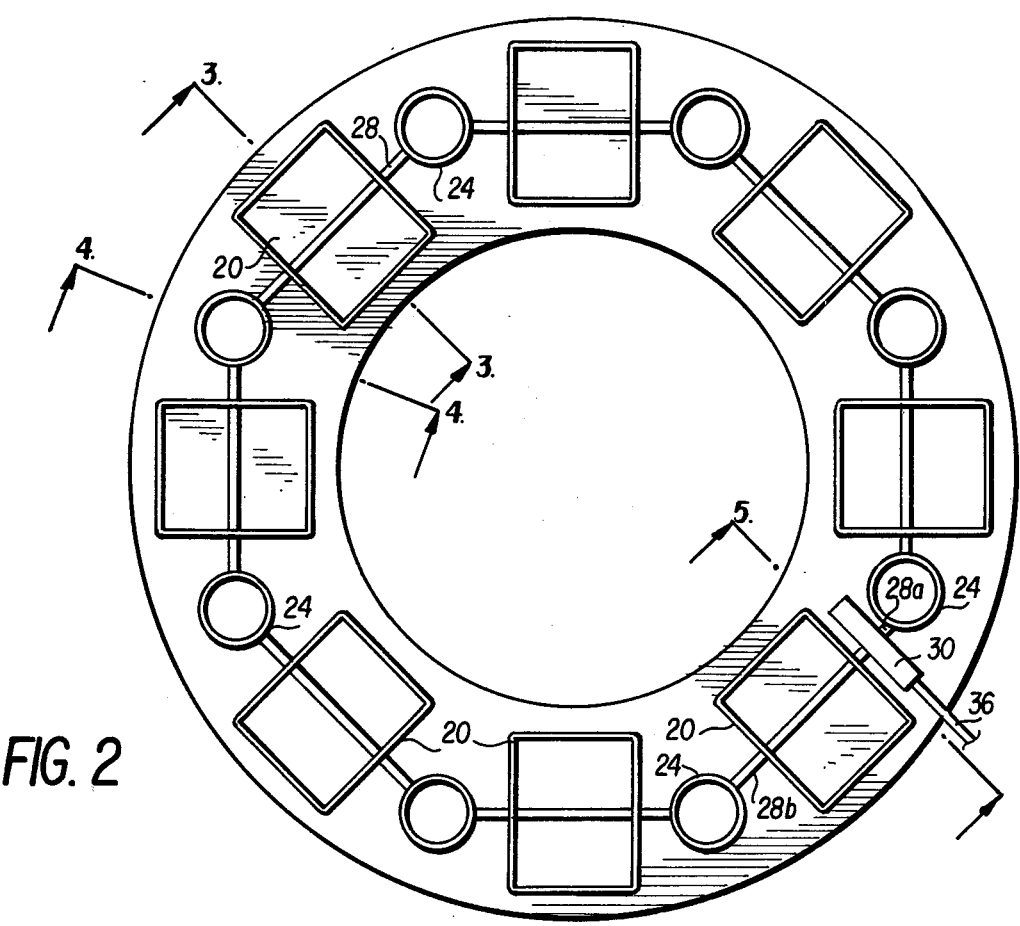
FIG. 2 is a plan view of the feed and watering device of the present invention.
Figure 3:
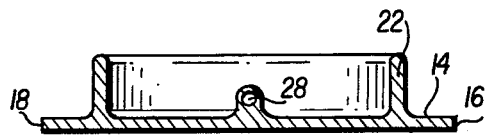
FIG. 3 is a view in cross section of a feed pan taken along the lines 3—3 of FIG. 2.
Figure 4:
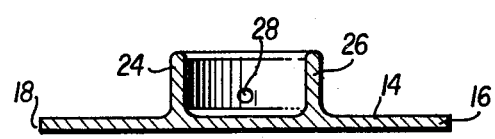
FIG. 4 is a view in cross section of a watering trough taken along the lines 4—4 of FIG. 2.

Referring now more specifically to the drawings where like characters of reference indicate like elements in each of the several figures, numeral 10 indicates generally the feed and watering device of the present invention. The device 10 is made entirely of plastic or similar durable, lightweight material which can be moulded as a single or monolithic piece.

The device 10 as shown in FIGS. 1, 2, 3 and 4 is generally ring-shaped having an outside diameter substantially equal to the diameter of the brooder 12 beneath which it is positioned during the critical 1 to 14 day period in the life of newborn poultry. The ring-shaped base 14 of the device has an outer circular edge 16 and an inner circular edge 18 of a thickness of approximately three-sixteenths of an inch. A plurality of feed pans 20 integrally formed with the base 14 are provided which are of generally rectangular shape extending radially between the inner and outer edges 14, 16 respectively. The feed lids 20 are equally spaced from each other and from the center of said base 14 and are preferably eight in number although a greater or less number are possible if desired. The feed lids 20 have relatively low side walls 22 to permit the baby chicks to step into the pans to feed, thus greatly reducing the spillage of feed into areas external of the pans.

A plurality of water troughs 24 are also integrally formed with the base 14. The water troughs 24 are generally of circular shape and are located radially and intermediate adjacent feed pans 20. The water troughs 24 also have a side wall 26 which is relatively low to permit the baby chicks to reach the water level in the trough while standing on the base 14. All but two of the water troughs 24 are directly connected to the trough adjacent to it by means of a conduit or pipe 28 also integrally formed with base 14. The piping 28 between adjacent troughs 24 extends through the bottom of feed pans 20 and opens into the troughs 24 through side walls 26.

In order to control the flow and level of water in each of the water troughs 24, a tank 30 is provided. The tank 30 is also formed integrally with the base 14 and is normally located intermediate one of the water troughs 24 and a feed pan 20. The two aforementioned troughs which are not directly connected to the trough adjacent to it are themselves connected by pipes 28a and 28b to the tank 30. The tank 30 is generally rectangular in shape and has the piping 28a and 28b extending through side walls 32 thereof and integrally formed with the base 14. As can readily be seen, the water level in each of the interconnected troughs 24 will be the same at all times as the water level in tank 30.

Figure 5:
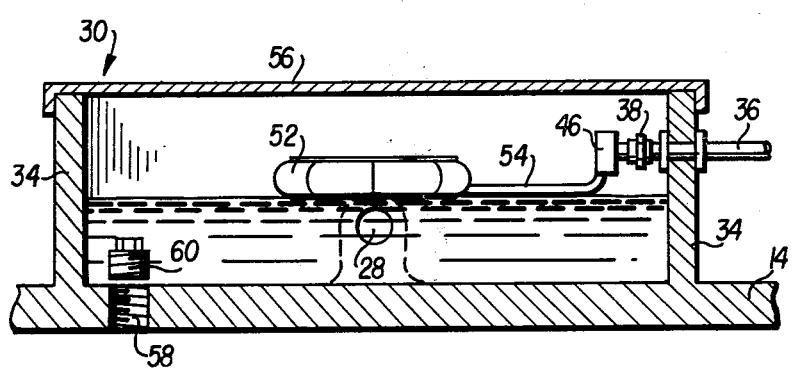
FIG. 5 is a view in cross section of the water level control device taken along the lines 5—5 of FIG. 2.
Figure 6:
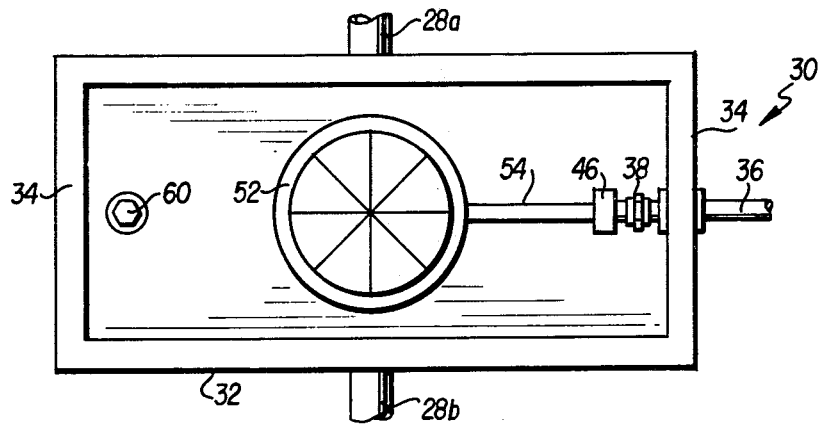
FIG. 6 is a plan view of the water level control device.
Figure 7:
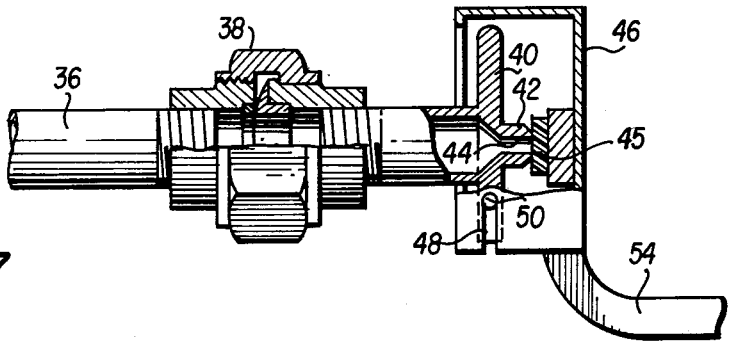
FIG. 7 is a fragmentary view in partial cross section of the float actuated control valve of the present invention.

Referring now to FIGS. 5, 6 and 7, the tank 30 has extending through an end wall 34 thereof a pipe 36 which is connected at one end to a source of fresh, external water. The other end is connected via pipe coupling 38 to a valve 40. The valve 40 has a valve seat 42 with an opening 44 extending therethrough. A valve head 45 made of a slightly compressible, elastomeric material such as hard rubber is secured to a housing 46. The housing 46 has a slot 48 on either side thereof which slides over a pin 50 secured to the valve 40. The housing 46 is thus capable of pivoting relative to the valve 40 and while so pivoting, the valve head 46 is moved into and out of sealing engagement with valve seat 42 and opening 44. A float 52 is secured to the housing 46 by means of a rod 54 to thereby open and close valve 40 depending on the level of water in the tank 30. The desired water level in tank 30 and troughs 24 can be adjusted by slight bending of the rod 54 to re-position the float 52. A pan 56 is also provided for tank 30 to prevent debris from entering the tank and interfering with the operation of the valve 40.

A drain hole 58 is also formed in the base 14 and extends from the bottom of tank 30 to the bottom surface of base 14. When the device 10 is in use, a plug 60 can be inserted in the opening 58 and when not in use, removal of the plug 60 accompanied by a slight tilting of the base 14 will permit all of the troughs 14 as well as the tank 30 to be drained.

Applicant has thus described his monolithic feed and watering device for newborn poultry which fulfills all of the objects heretofore stated. The foregoing description is to be considered illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What I claim is:

1. A monolithic feed and watering device for newborn poultry comprising:
   a. a circular shaped base,
   b. a plurality of feed pans integrally formed with said base equidistant from the center of said base and adjacent each other, each of said feed pans being of a size and having a side wall of a height low enough to enable a plurality of said newborn poultry to step into said pan and feed therein,
   c. a plurality of watering troughs also integrally formed with said base, one of said watering troughs being located between two of said adjacent feed pans, each of said watering troughs having a side wall of a height low enough to enable said newborn poultry to drink therefrom while standing on said base, and
   d. means for supplying fresh water to each of said watering troughs.

2. A device as set forth in claim 1 wherein all but two of said adjacent watering troughs are interconnected by piping.

3. A device as set forth in claim 2 wherein said two watering troughs unconnected by piping are each connected by piping to said means for supplying fresh water to each of said watering troughs.

4. A device as set forth in claim 3 wherein said means for supplying water to each of said watering troughs comprise
   a. tank means integrally formed with said base and having said piping from said two unconnected watering troughs integrally formed with said base means and extending into said tank, and
   b. float actuated valve means positioned in said tank means and connected to an external source of water, said float actuated valve means serving to maintain the water level in each of said plurality of watering troughs.

5. A device as set forth in claim 4 wherein said feed pans are rectangular in shape and said watering troughs are circular in shape.

* * * * *